US011548385B2

(12) United States Patent
Vikman et al.

(10) Patent No.: US 11,548,385 B2
(45) Date of Patent: Jan. 10, 2023

(54) POWER GENERATION ASSEMBLY

(71) Applicant: THERMO KING LLC, Minneapolis, MN (US)

(72) Inventors: Esa Heikki Matias Vikman, Espoo (FI); Petri J Maki-Ontto, Espoo (FI)

(73) Assignee: THERMO KING LLC, Minneapolis, MN (US)

( * ) Notice: Subject to any disclaimer, the term of this patent is extended or adjusted under 35 U.S.C. 154(b) by 319 days.

(21) Appl. No.: 16/832,636

(22) Filed: Mar. 27, 2020

(65) Prior Publication Data
US 2021/0300178 A1 Sep. 30, 2021

(51) Int. Cl.
*B60K 25/06* (2006.01)
*H02K 7/00* (2006.01)
*B60P 3/20* (2006.01)
*B60H 1/00* (2006.01)

(52) U.S. Cl.
CPC ......... *B60K 25/06* (2013.01); *B60H 1/00428* (2013.01); *B60P 3/20* (2013.01); *H02K 7/006* (2013.01)

(58) Field of Classification Search
None
See application file for complete search history.

(56) References Cited

U.S. PATENT DOCUMENTS

| | | | | |
|---|---|---|---|---|
| 4,990,807 A | * | 2/1991 | Flygare | H02K 19/38 310/112 |
| 7,057,303 B2 | | 6/2006 | Storm et al. | |
| 9,777,698 B2 | * | 10/2017 | Schlak | F03D 13/20 |

* cited by examiner

*Primary Examiner* — Faye M Fleming
(74) *Attorney, Agent, or Firm* — Hamre, Schumann, Mueller & Larson, P.C.

(57) ABSTRACT

There is disclosed a power generation assembly (300) for powering a transport refrigeration system (TRS) (52) of a vehicle (10), the power generation assembly (300) comprising: a torque converter (402) having an engine side input (404) and a transmission side output (406); a power take-off device (302) coupled to the engine side input (404) of the torque converter (402), the power take-off device (302) having a rotary output; a permanent magnet generator (304) having a rotor (420) directly coupled to the power take-off device (302) for power generation; wherein the power generation assembly (300) is configured to be housed in an engine bay (210) of a vehicle (10), and is configured to generate at least 8 kW of power when the engine side input (404) has a rotational speed of 500 rpm.

20 Claims, 5 Drawing Sheets

POWER GENERATION ASSEMBLY

TECHNICAL FIELD

The invention relates to a power generation assembly for powering a transport refrigeration system (TRS) of a vehicle.

BACKGROUND

It is known to fit a transport refrigeration system (TRS) and/or a heating, ventilation and air condition (HVAC) system to a vehicle in order to transport goods in a temperature controlled environment. A TRS is generally used to control an environment condition (e.g. temperature, humidity, air quality, and the like) within a cargo space of a transport unit (e.g. a truck, a container (such as a container on a flat car, an intermodal container etc.), a box car, a semi-tractor, a bus, or other similar transport unit). The TRS can maintain environmental condition(s) of the cargo space to maintain cargo (e.g. product, frozen foods, pharmaceuticals etc.). In some embodiments, the transport unit can include a HVAC system to control a climate within a passenger space of the vehicle.

It is known to provide power for a TRS or other accessory system on a vehicle using a power take-off device, which takes mechanical power from an engine or a transmission coupled to a prime mover such as an internal combustion engine (e.g. a diesel engine). The mechanical power is coupled to a hydraulic pump within the engine bay of the vehicle which circulates a hydraulic fluid out of the confines of the engine bay to other parts of the vehicle or a connected trailer, where a hydraulic motor and electric generator is installed to a generate electric power for an electric TRS system or other electrically-powered system.

It is also known to transfer mechanical power from the power take-off device out of the engine bay of the vehicle using a long prop-shaft. The other end of the prop-shaft can either be directly coupled to a relatively large diameter generator in order to provide sufficient electrical power for a TRS, or may be indirectly coupled to a relatively small diameter generator via a gearbox or belt and pulley system.

However, such arrangements are complex in that they involve a large number of components in order to transport power from the engine bay to the TRS or other system, for example bearings, flexible joints and couplings and clutches.

SUMMARY OF THE INVENTION

According to a first aspect there is disclosed a power generation assembly for powering a transport refrigeration system (TRS) of a vehicle, the power generation assembly comprising:
 a torque converter having an engine side input and a transmission side output;
 a power take-off device coupled to the engine side input of the torque converter, the power take-off device having a rotary output;
 a permanent magnet generator having a rotor directly coupled to the power take-off device for power generation;
 wherein the power generation assembly is configured to be housed in an engine bay of a vehicle, and is configured to generate at least 8 kW of power when the engine side input has a rotational speed of 500 rpm.

The term "directly coupled", as used in the context of the rotor being directly coupled to the power take-off device, is intended to mean that the rotor is fixedly mounted to a rotary output of the power take-off device, such that there is no intervening flexible coupling or propshaft between them, nor any multiplier system effecting a gear ratio between the power take-off device and the rotor (such as a pulley and belt system).

It may be that the power take-off device is coupled to the engine side input of the torque converter by a clutch-less connection.

It may be that the power take-off device provides a gear ratio between the engine side input of the torque converter and the rotor of the permanent magnet generator of between 1:1.1 and 1:1.75, for example between 1:1.2 and 1:1.5.

When the gear ratio is 1:1.5, the power generation assembly may be configured to generate at least 10 kW of power when the engine side input has a rotational speed of 500 rpm.

It may be that the torque converter is mounted within a support casing so that a rotation axis of the torque converter is fixed with respect to the casing, and wherein the power take-off device and the permanent magnet generator are fixedly mounted to the support casing.

In the context of a rotational component being fixedly mounted to another component, fixedly mounted is intended to mean that the respective rotational component is mounted so that its axis of rotation and any stationary components are held in fixed registration with the other component.

It may be that the support casing is provided with damping supports for coupling to a frame of the engine bay of the vehicle so as to permit movement of the support casing relative to the frame. The power take-off device and the permanent magnet generator may be mounted to the support casing so that in use they move relative to the frame together with the support casing.

It may be that a transmission is coupled to the transmission side output of the torque converter, the transmission being provided within the support casing. The support casing may have an elongate extent along a rotational axis of the transmission. The permanent magnet generator may be elongate along a generator axis about which the rotor rotates. With respect to the rotational axis of the transmission, the axial extent of the permanent magnet generator may overlap with or be within the axial extent of the support casing.

It may be that the power take-off device and the permanent magnet generator are configured so that the generator axis is substantially parallel to the transmission axis and/or a rotary axis of the engine side input. The engine side input may be a shaft between the engine and the torque converter.

It may be that the generator comprises a bearing arrangement configured to support the rotor, separate from any bearing arrangement of the power take-off device. The generator may comprise bearing arrangements at each axial end of the rotor.

It may be that the generator has a length L along the generator axis and a rotor outer diameter D, wherein the length to diameter ratio L/D is at least 2, for example at least 2.5.

The generator may be a 6-pole generator (3 pole pairs).

It may be that the L/D ratio is at least 200% greater than $$\frac{\pi}{4\sqrt{p}},$$

wherein p is the number of pole pairs, for example at least 300% greater or 400% greater.

The power generation assembly may comprise a liquid cooling arrangement for the generator.

It may be that the generator comprises an end shield at an axial end opposite the power take-off device. The generator may comprise fluid ports for coupling a liquid cooling circuit to cooling channels within the generator, and wherein the fluid ports are provided in the end shield; and/or electrical terminals for stator windings of the generator may be provided in the end shield.

It may be that the generator is provided in a generator housing having a diameter or characteristic lateral dimension at axial locations along the generator axis of no more than 200 mm, for example no more than 175 mm or no more than 150 mm. The characteristic lateral dimension may be a largest dimension of the generator housing in a plane normal to the generator axis.

It may be that the rotor has a laminated structure comprising a plurality of laminations, each lamination comprising slots which are aligned along the generator axis to define elongate channels in which respective permanent magnets are received.

It may be that the generator is configured to provide power to a load via a load circuit, the generator having an output voltage which is a function of the rotational speed of the rotor. The power generation assembly may further comprise a controller configured to selectively electrically isolate the generator based on determining a high voltage condition of the power generation assembly.

It may be that the controller determines the high voltage condition of the power generation assembly based on a rotation parameter indicative of a rotational speed of the rotor; or an electrical parameter indicative of a voltage, current or power in the load circuit.

The high voltage condition may corresponds to: rotation of the engine side input of the torque converter at or above a threshold engine rotational speed, wherein the threshold rotational speed is at least 2,000 rpm, for example at least 2,500 rpm; or rotation of the rotor of the generator at or above a threshold generator speed, wherein the threshold generator speed is at least 3,000 rpm, for example at least 3,500 rpm.

According to a second aspect there is provided a vehicle comprising a transport refrigeration system in accordance with the first aspect. It may be that the vehicle comprises an engine bay, and wherein the power generation assembly is disposed within the engine bay.

It may be that the damping supports as described above extend between a frame of the engine bay and the support casing. There may be no supports extending between the frame of the engine bay and the power take-off device. There may be no supports extending between the frame of the engine bay and the generator.

It may be that the transport refrigeration system (TRS) is installed in the vehicle and the generator is coupled to the transport refrigeration system to provide power to the transport refrigeration system.

Power may be provided directly from the generator to the transport refrigeration system without any intervening hydraulic system.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

The invention will now be described, by way of example only, with reference to the accompanying drawings, in which.

DETAILED DESCRIPTION

This disclosure relates generally to power generation assemblies for vehicles. The examples described herein are suitable for providing power to a transport climate control system such as a TRS, an HVAC system or any other accessory system.

The expression "transmission" is used herein according to the American English convention, by which it refers to a gearbox arrangement for switching between gear ratios, rather than the British English convention by which it refers to the whole drivetrain of a vehicle.

Figure 1:
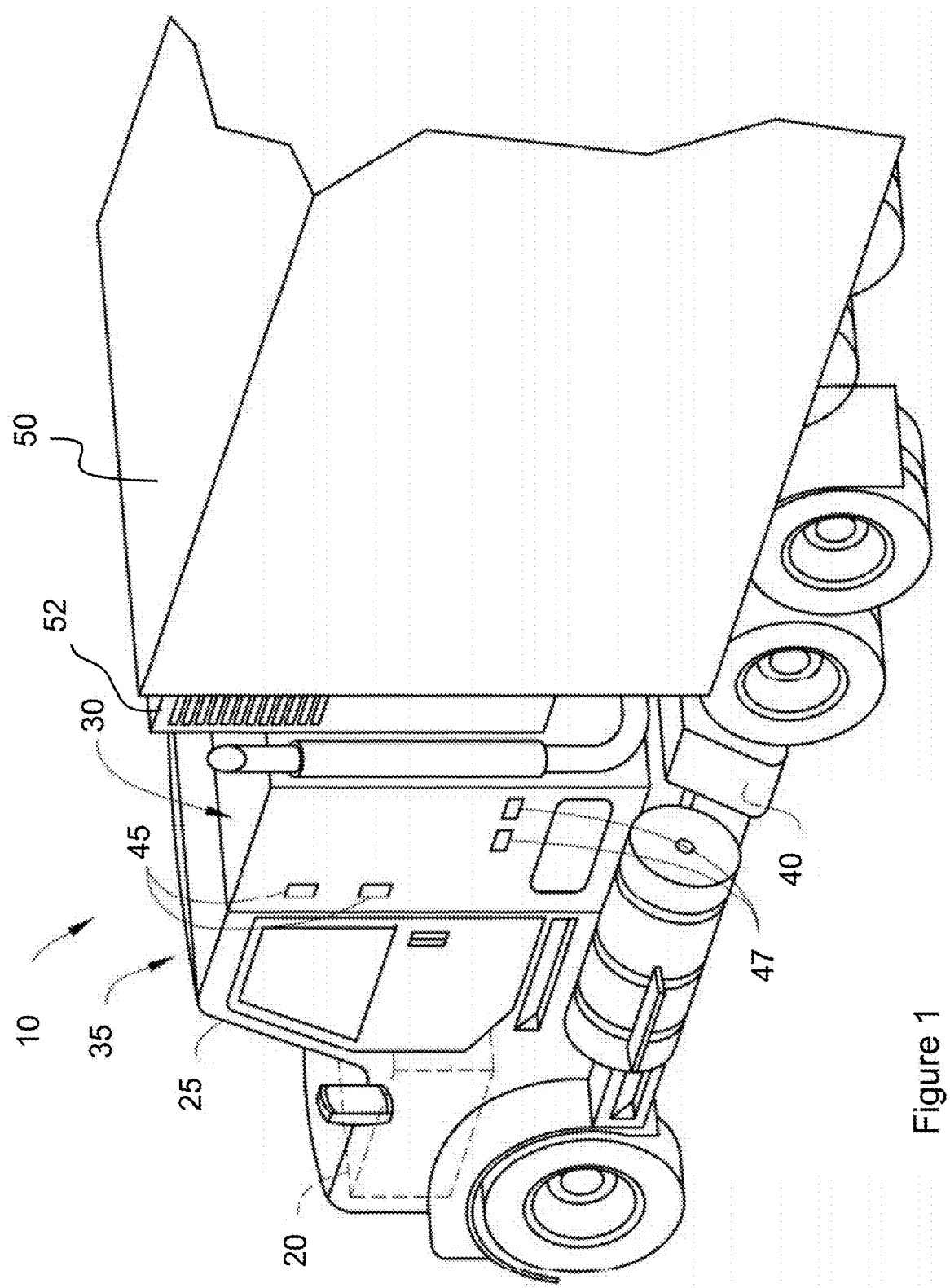
FIG. 1 is a perspective view of an example tractor vehicle.

FIG. 1 shows an example vehicle 10, in particular a semi-tractor that is used to transport cargo stored in a cargo compartment (e.g. a container, a trailer, etc) to one or more destinations.

The example vehicle 10 includes a prime mover 20, a cabin 25 defining a sleeping portion 30 and a driving portion 35, an APU 40, and a plurality of vehicle accessory components 45 and cabin accessory components 47 (e.g. electronic communication devices, cabin lights, a primary and/or secondary HVAC system, primary and/or secondary HVAC fan(s), sunshade(s) for a window/windshield of the vehicle 10, cabin accessories etc.). In this particular example, the prime mover 20 is an engine, in particular a diesel engine. The primary mover may provide sufficient power to operate (e.g. drive) the vehicle 10 and any of the plurality of vehicle accessory components 45 and cabin accessory components 47, for example by power generation using an alternator coupled to the prime mover. The APU 40 (auxiliary power unit) is a secondary power unit for the vehicle 10 which may be used when the primary mover is deactivated, and which may be charged when the vehicle 10 is being driven.

As partially shown in FIG. 1, a trailer is coupled to the vehicle 10 and carries a cargo compartment 50 provided with a transport refrigeration system (TRS) 52 configured to control the climate of the interior of the cargo compartment 50.

The power supply requirements of a TRS may be approximately 20 kw-45 kW. Other vehicle accessory systems may require power supply of a similar magnitude. As will be appreciated, such a power supply requirement would exceed the power rating of a vehicle alternator.

The vehicle is provided with a power generation arrangement for providing power to the TRS or other electrical system by directly converting mechanical power from a power take-off device to electrical power. Such arrangements may provide sufficient power to operate a TRS, HVAC or other vehicle systems.

Figure 2:
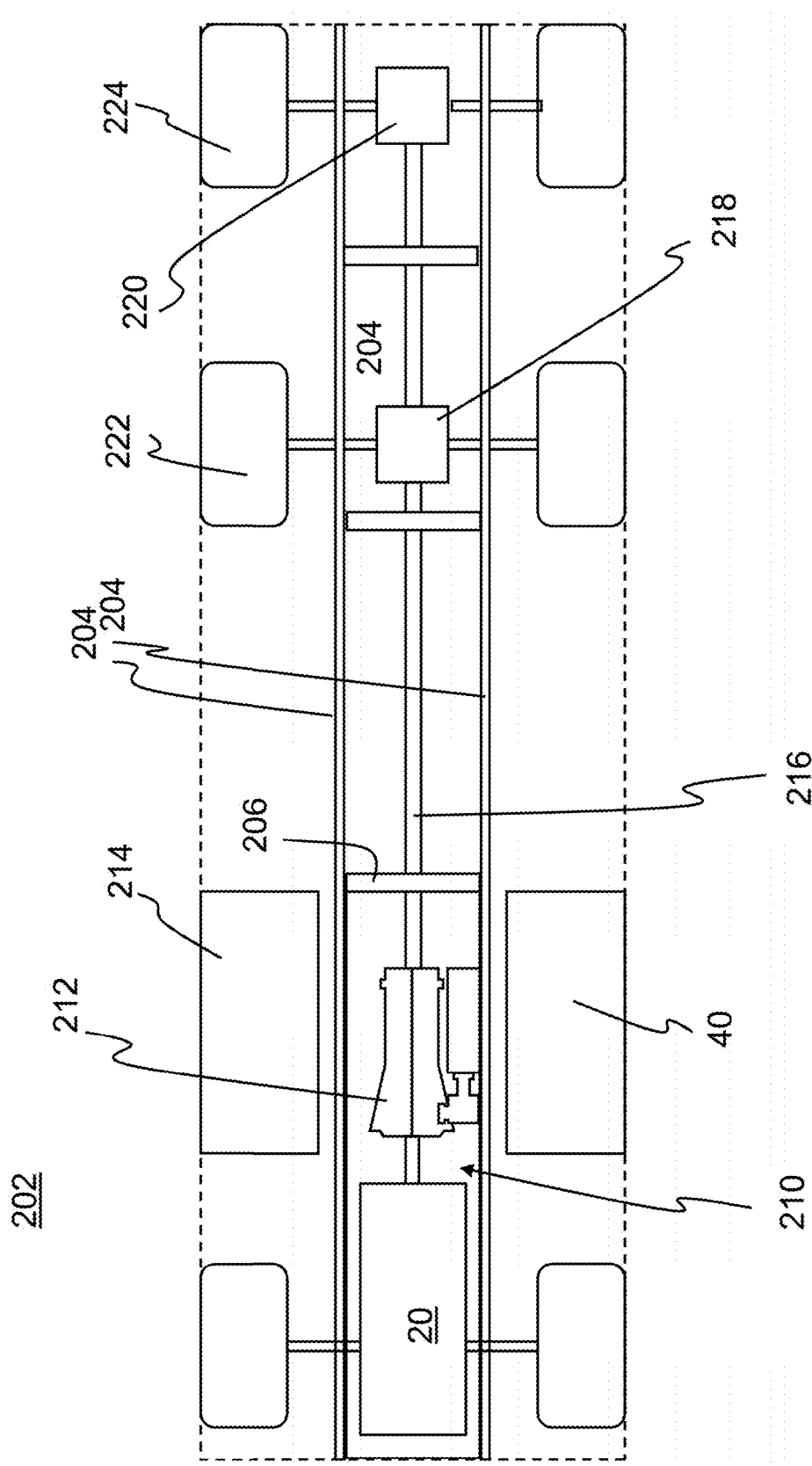
FIG. 2 schematically shows a plan layout of equipment supported on a vehicle chassis.

FIG. 2 shows a simplified plan layout of equipment supported on a chassis 202 of the example electrical vehicle 10 of FIG. 1. The layout includes the chassis 202, which in this simplified example is illustrated by two longitudinally-extending support members 204 with laterally-extending cross members 206.

A pair of front wheels 206 are supported on a front axle 208. An engine bay 210 is defined between the two longitudinally-extending support members 204, and the prime mover 20 (e.g. diesel engine) is provided in the engine bay, coupled by a shaft to a torque converter and transmission provided within a support casing 212. As shown in FIG. 2, the engine bay 210 is bounded to define a relatively confined space. In particular, it is bounded by the two longitudinally-extending support members and a cross-member extending between them rearward of the support casing 212 housing the torque converter and the transmission.

Outboard of the engine bay on either side of the support members 204 there is an exhaust treatment unit 214 and the APU 40.

A propshaft 216 extends rearward from the support casing 212 (i.e. coupled to the transmission within the support casing 212) and extends along a middle portion of the length of the chassis towards the rear wheels. The propshaft 216 is coupled to differentials 218, 220 which drive pairs of rear wheels 222, 224.

Figure 3:
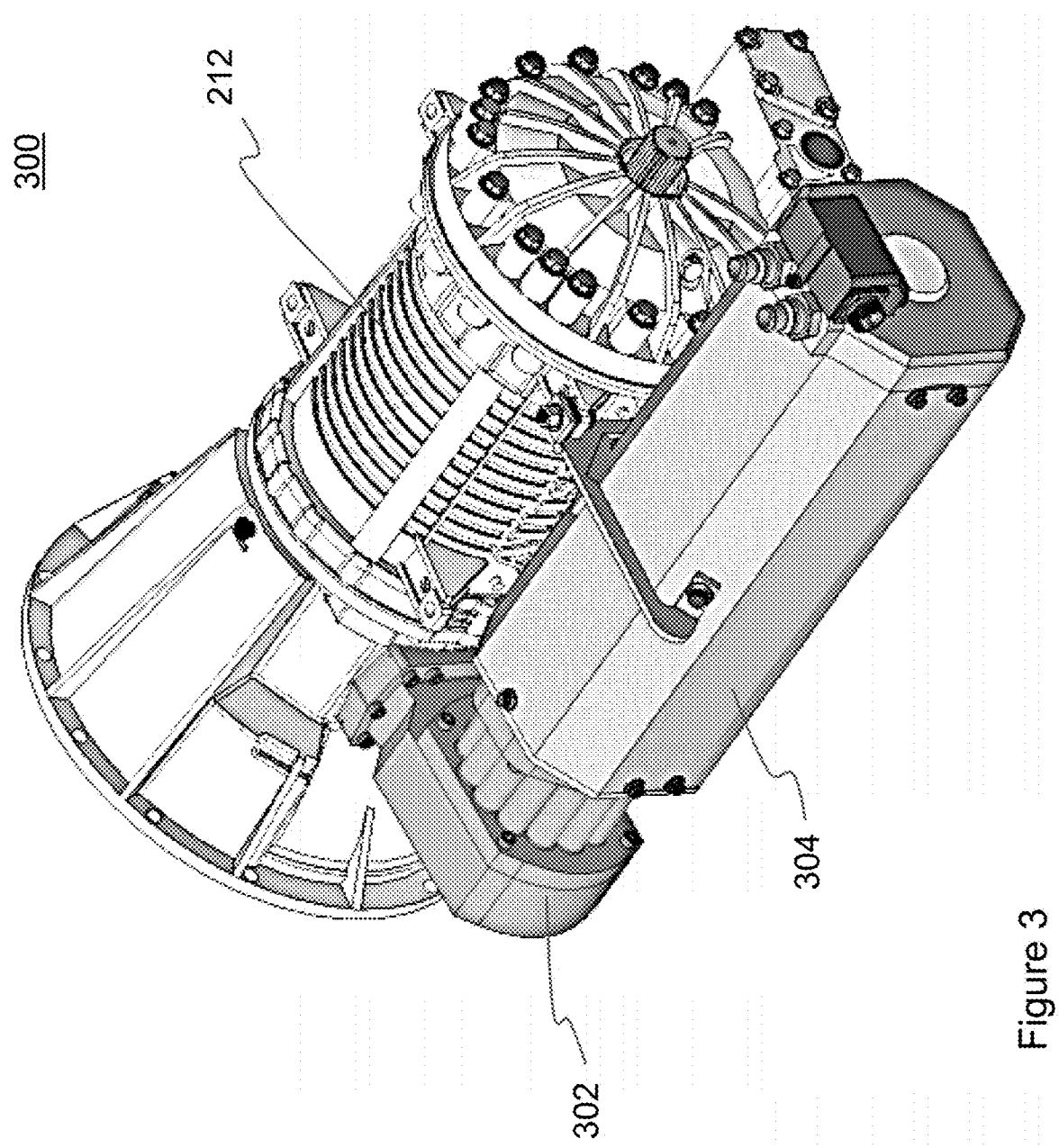
FIG. 3 is a perspective view of an example power generation assembly.
Figure 4:
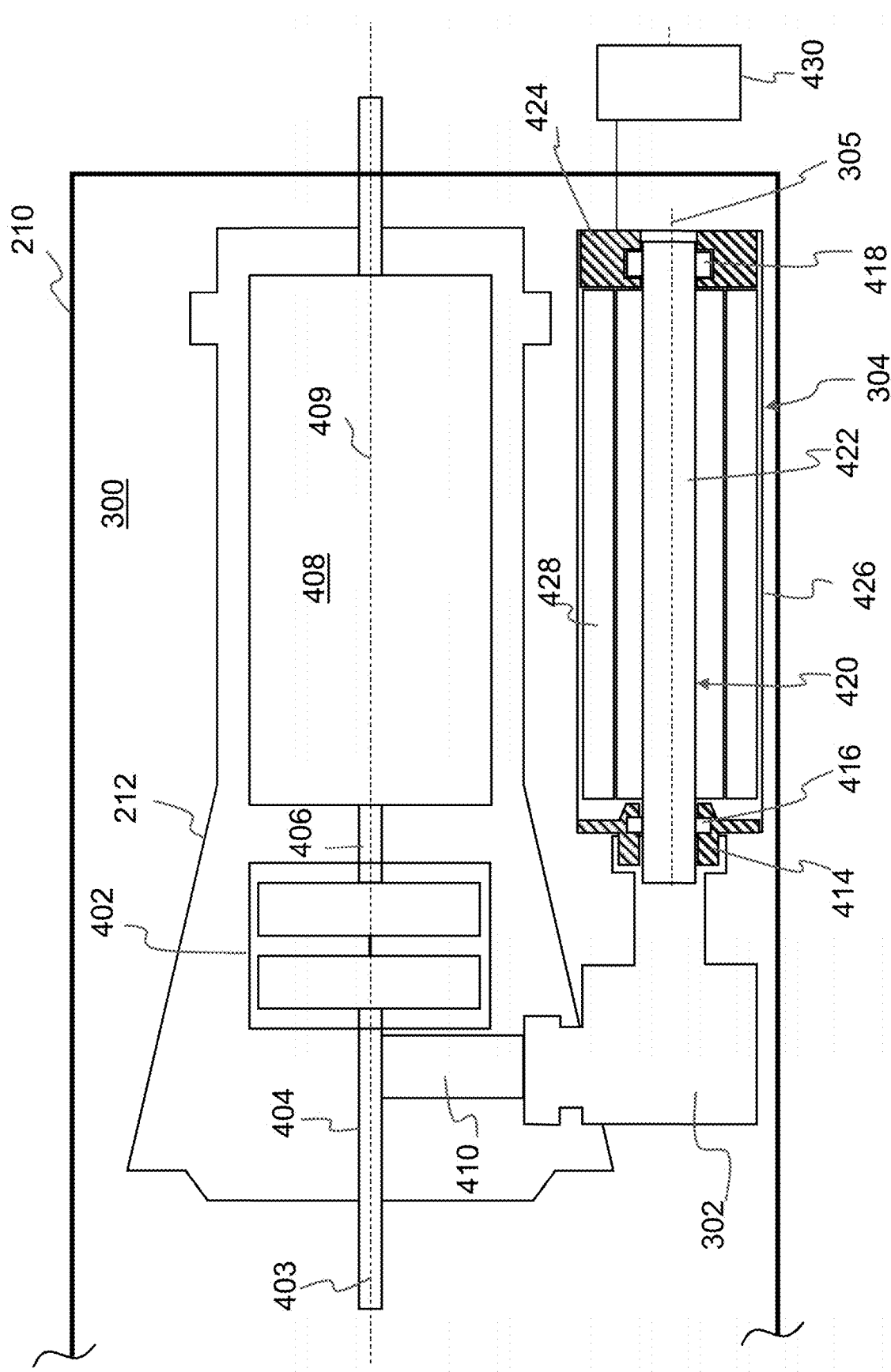
FIG. 4 is a schematic cross-sectional view of the example power generation assembly.

FIGS. 3 and 4 schematically show an example power generation assembly 300 for the vehicle 10. The power generation assembly includes the torque converter and transmission as described above, provided within the support casing 212 as described above. A power take-off device 302 and generator 304 are mounted on one side of the support casing 212 to convert mechanical power to electrical power as will be described in more detail below, with the generator 304 lying side by side with the support casing 212.

The example support casing 212 has a frustoconical portion towards an engine side of the casing (e.g. a front side) which blends with a substantially cylindrical portion towards an output side of the casing (e.g. a rear side). As best shown in FIG. 4, the frustoconical portion generally houses a torque converter 402 which has an engine side input 404 (e.g. a shaft coming from the engine) and a transmission side output 406 (e.g. a shaft extending from the torque converter to the transmission 408), whereas the transmission is housed within the substantially cylindrical portion. In this example both the engine side input 404 and the transmission side output 406 are rotatable about a common rotational axis 403 of the torque converter, which is coaxial with a central rotation axis 409 of the transmission 408. The torque converter may be a hydraulic torque converter configured to transfer torque from the engine side input 404 to the transmission side output 406 while permitting relative slip in some conditions.

As best shown in FIG. 4, the power take-off device 302 is mounted on a side of the support casing 212 where there is a slot for engaging with a mechanical transfer arrangement 410 within the support casing 212, the mechanical transfer arrangement 410 being configured to transfer mechanical power from the engine side input 404 to an interface component which interfaces with the power take-off device 302 to provide a rotary input to the power take-off device 302. For example, the mechanical transfer arrangement 410 may comprise one or more non-coaxial gears, or a laterally-extending shaft and one or more bevel gears. In this particular example, the mechanical transfer arrangement 410 comprises an interface component in the form of a gear which is configured to rotate about an axis parallel to and laterally offset from the rotation axis 403 of the torque converter, such that teeth of the gear are engageable through the slot in the support casing, by corresponding teeth on an interface component of the power take-off device 302.

In this example, the power take-off device 302 is configured to transfer the rotary input provided to the interface component of the power take-off device to a rotary output having an output rotation axis laterally offset from the interface component. This permits the power take-off device 302 to provide mechanical power to a driven device (e.g. the generator) which is laterally separated from the support casing 212. For example, the power take-off device may comprise the interface component in the form of a gear which receives the rotary input and is rotatable about a first power take-off axis, and a rotary output component in the form of a shaft rotatable about a second power take-off axis, the shaft having teeth for engaging the interface component and a socket for connecting with a driven device.

The inventors acknowledge the benefits and advantages of using commercial off the shelf (COTS) components in the power generation assembly. There is a market for power take-off devices, which presently provides power take-off devices substantially as described above. Such power take-off devices are provided to the automotive industry to transfer mechanical power to a hydraulic pump (as described in the background).

In known power take-off arrangements for powering a hydraulic pump, a power take-off device receives rotary input from a mechanical transfer arrangement coupled to the transmission side output of the torque converter or the transmission itself (rather than the engine side input), which rotates at the engine rotational speed when the torque converter is engaged. The power take-off device provides rotary output to the hydraulic pump so that there is a relatively low gear ratio between the torque converter and the rotary output of the power take-off device, for example between 1:1 and 1:1.5. Such a gear ratio is acceptable for driving conventional hydraulic pumps. Since the power take-off device is coupled to the transmission side output of the torque converter or the transmission (rather than the engine side input), no mechanical power is transferred to the power take-off device and hydraulic pump when the torque converter is disengaged (e.g. when the engine is idling).

The inventors have found that, while COTS power take-off devices provide a satisfactory gear ratio between the engine rotational speed and a rotary output for a hydraulic pump, the output rotational speed is relatively low for operating an electrical generator.

Design theory for permanent magnet generators teaches that there is an optimal ratio of length to outer diameter for the rotor (L/D), which is determined by the following equation as a function of the number of the number of pole pairs p:

$$\frac{L}{D} = \frac{\pi}{4p} \cdot \sqrt{p}$$

This equation is provided in the textbook "Design of Rotating Electrical Machines", by Juha Pyrhonen, Tapani Jokinen, Valeria Hrabovcova, ©2008 John Wiley & Sons, Ltd. ISBN: 978-0-470-69516-6 pp 297.

With the L/D set, the diameter of the rotor is varied in order to achieve sufficient power generation for a given rotational speed. Accordingly, for a target amount of power generation, a relatively lower rotational speed translates to a larger diameter, whereas a relatively higher rotational speed translates to a smaller diameter.

As mentioned in the background of this application, previously considered arrangements include (i) having a large diameter generator, coupled to the power take-off device by a prop-shaft; or (ii) providing a series of gears or a belt and pulley arrangement to increase the rotational speed of the generator.

The present disclosure provides a power generation assembly 300 which avoids the disadvantages associated with those previously-considered arrangements, by providing a compact electrical generator 304 with high power density, directly coupled to the power take-off device 302.

As shown in FIG. 4, the power generation assembly 300 is provided within an engine bay 210 of the vehicle 10, in which there is limited space for providing accessory components. The support casing 212 is supported on a frame of the engine bay 210 by a plurality of damping supports 413 that extend from the frame to mounting points on the support casing 212. The damping supports are configured to support the support casing 212 (and thereby the power take-off device 302 and the generator 304) while permitting minor relative movement by extension, retraction or flexing of the damping supports, thereby partially isolating the power generation assembly 300 form vibrations experienced by the frame of the engine bay 210 during use.

The inventors have found that a power take-off device which effects a relatively low gear ratio between the engine side input of the torque converter and the rotary output of the power take-off device can be used to generate sufficient power for a transport refrigeration system (TRS) or comparable accessory device (e.g. an HVAC system) using a compact generator having a high aspect ratio rotor is used. For example, the L/D ratio of the rotor of the generator may be at least 2, for example at least 2.5. By using a relatively long rotor with a relative small diameter, a rotor volume can be achieved which is equivalent to a shorter rotor having a larger diameter. Power generation is a function of rotor volume and rotational speed.

While the conventional teaching in the art is to provide a shorter, larger diameter rotor for optimal efficiency (as discussed above with respect to the L/D ratio), the inventors have considered that a lower efficiency is acceptable in order to achieve a compact generator that reduces the complexity of the power generation assembly as a whole, as will become apparent from the following discussion.

Referring again to the example power generation assembly of FIGS. 3 and 4, the compact generator 304 can:
be directly coupled to the power take-off device 302 within the confines of the engine bay 210;
be directly supported on the support casing 212, thereby obviating any need for separate damping supports dedicated to supporting the generator;
generate power for a TRS (e.g. between 8 kW and 42 kW for supply to a TRS system that has an operational power demand of between 20 kW and 45 kW) at a relatively low rotational speed while having a relatively low diameter, by virtue of the high L/D ratio of the rotor. This obviates any need for a geared arrangement or belt and pulley system between the power take-off device and the generator, while permitting the use of a COTS power take-off device that effects a relatively low gear ratio between the engine input side of the torque converter and the rotary output to the generator.

As shown in FIG. 4, the generator 304 extends along a generator axis 305 from a first proximal end where it is coupled to the power take-off device 302 to a second distal end. The terms proximal and distal indicate proximity to a body or support. Herein they are used with respect to the supporting and functional connection to the power take-off device 302. Since the first end is supported on the power take-off device, this is referred to as the proximal end, whereas the opposing end is considered to be the distal end.

As shown in FIG. 4, the generator 304 comprises a support fitting at the first end which is configured to couple with cooperating formations or fittings on the power take-off device 302. In this particular example, the support fitting 414 is configured to be inserted within a socket opening of the power take-off device where the rotary output is provided. The support fitting 414 may be secured to the power take-off device by one or more fasteners, such as bolts.

The example generator 304 comprises first and second bearing arrangements 416, 418 at respective first and second ends, for supporting a rotor shaft 422 of a rotor 420. In this example, the rotor shaft 422 is directly connected to the power take-off device 302, in particular by virtue of a splined end of the rotor shaft 422 interfacing with the rotary output of the power take-off device 302. The first bearing arrangement 416 is supported by the support fitting 414, whereas the second bearing arrangement 418 is supported by end shield of the generator provided at the second end of the generator 304. A housing wall 426 extends between the support fitting 414 and the end shield 424. The bearing arrangements may comprise any suitable combination of bearings, such as one floating bearing and one axial locating bearing, or a single bearing toward one end of the generator (such as towards the distal end).

The example generator 304 further comprises a stator 428 disposed radially outward of the rotor 420. In this example the stator comprises a plurality of windings about a stator core. Stator cables extend from the windings through the end shield 424 of the rotor for coupling to a load. In this example, the generator is provided with a controller 430 which is configured to control electrical coupling of the stator cables to a load. As schematically shown in FIG. 4, in this example the controller is outside of the housing of the generator, and may be provided as part of an electrical system to which the generator is coupled. However, in other examples, the controller may be integrally provided with the generator. Operation of the controller will be described in further detail below with respect to an example of use.

The generator is shown in more detail in the cut-away view of FIG. 5, and particular reference is made in the following description to further details of the rotor and the end shield.

Figure 5:
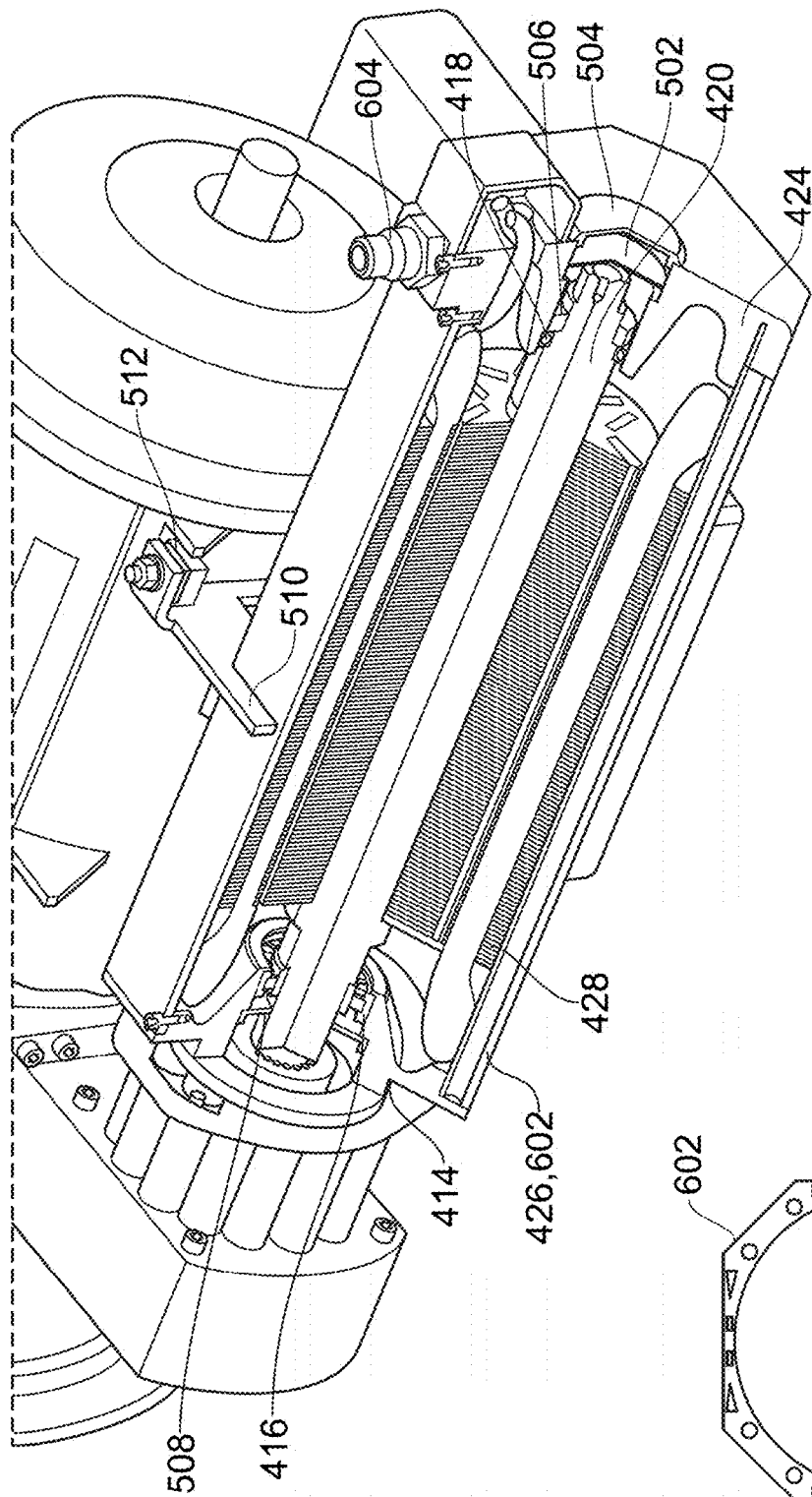
FIG. 5 is a perspective cut-away view of generator of the example power generation assembly.

As partially shown in FIG. 5, the rotor comprises a plurality of slots for permanent magnets which terminate at axial end faces of the rotor, as illustrated by the V-shaped pairs of magnet ends. In this example, the rotor 420 has a laminate structure formed about a central core. In particular, the rotor shaft 422 is provided, and a series of punched laminates are provided on the rotor shaft 422 in an axially-stacked arrangement, each laminate having punched holes which, when stacked together, provide elongate slots to receive permanent magnets. The laminated structure provides for a relatively inexpensive manufacturing process for a permanent magnet rotor. In this example, the rotor has 6 poles (i.e. 3 pole pears), each pole comprising a two permanent magnets in a V-shaped arrangement as shown (i.e. such that in a plane normal to the generator axis 305, at an azimuthal position corresponding to a respective pole, the cross-sectional profile of each permanent magnet provides a limb of a V, converging towards one another towards the generator axis 305 but not touching).

As explained above, the optimal L/D ratio for a rotor can be determined based on the number of pole pairs using the equation provided above, which outputs an optimal L/D ratio of 0.45 for a 6 pole rotor (3 pole pairs). In this particular example, however, the L/D ratio of the rotor is approximately 2.5, providing a laterally-compact rotor. A larger L/D permits the generator to be housed in a compact housing having a relatively low maximum diameter or characteristic lateral dimension (i.e. the longest line traversing a cross section normal to the generator axis 305, within a portion of the generator having a substantially constant cross-sectional profile). In this particular example, the maximum diameter and characteristic dimension are no more than 150 mm, which is relatively low considering the power output of the generator. In this example, the generator is configured to generate at least 8 kW when the engine rotational speed is 500 rpm, corresponding to the engine idle condition; rising to at least 40 kW when the engine rotational speed is 2500 rpm). In other examples, a larger arrangement may be permitted in the available space, for example the maximum diameter and characteristic dimension may be no more than 175 mm, or no more than 200 mm.

As shown in each of FIGS. 3-5, given that the support casing 212 has a relatively long axial extent along the transmission axis 409, the engine bay 210 is already configured to accommodate that axial extent, even if there is limited room around the support casing 212 at lateral sides. It is considered advantageous to provide a laterally-compact rotor and achieve a target rotor volume by extending its length. This may be achieved by providing a generator sized so, with respect to the transmission axis 409, it has an axial extent which overlaps with or is within the axial extent of the support casing 212. In this particular example, the axial extent of the generator overlaps with that of the support casing, with the first end naturally being aft of the front end of the support casing 212, and the second end extending a distance beyond extent of the support casing 212, as permitted by the arrangement of the engine bay 210. In this particular example, the generator axis 305 and the transmission axis 409 are substantially parallel.

FIG. 5 shows in more detail an example configuration of the end shield 424 at the second distal end of the rotor. As discussed above, the end shield 424 supports the second bearing arrangement. The end shield 424 also provides for electrical and fluid cooling connections to the generator.

Figure 6:
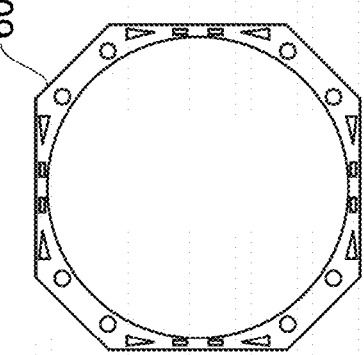
FIG. 6 is a schematic cross-sectional view of a housing of the generator of FIG. 5.

The fluid cooling connections are for suppling fluid cooling channels within the generator, which in this particular example are provided integrally with the housing 426 as best shown in FIG. 6. The fluid cooling connections may be coupled to an external fluid cooling circuit. For example, a cooling fluid may be provided by a transport refrigeration system (TRS) carried by the vehicle.

FIG. 6 is an exploded cross-sectional view of the housing, taken along a plane normal to the generator axis 305 to illustrate the presence of cooling channels 602 in the wall of the housing. As will be appreciated, the cooling channels may be arranged in a serpentine manner such that laterally-adjacent cooling channels are connected together at one end or another of the housing.

Referring again to FIG. 5, the end shield 424 provides inlet and outlet fluid ports 604 (one shown in the cut-away view of FIG. 5) which are fluidically coupled with the fluid channels of the housing. For example, the end shield may comprise an internal manifold configured to fluidically couple an inlet port to multiple fluid channels 602, and an internal manifold configured to fluidically couple an outlet port to multiple fluid channels 602.

The end shield 424 further comprises cabling ports by which stator cabling is routed through the end shield for coupling to a load.

By providing the cabling ports and the fluid ports 604 in the end shield, the profile of the generator along its axial length can be minimised. As shown in FIG. 6, the end shield is configured so that the fluid ports (and any internal manifolds) do not intersect with the cabling ports.

FIG. 5 illustrates further detail of the generator 304 as will be described below. At the second distal end of the generator 304, the end shield 424 has an opening coaxial with the rotor which permits proper assembly of the end shield 424 and the rotor 420. The opening is sealed with first and second seals 502, 504, spaced apart along the axis of the rotor. Axially adjacent the second bearing arrangement 418, a locating nut 506 is provided on the rotor shaft 422 which limits axial movement of the rotor shaft 422 relative a corresponding shoulder of the end shield 424.

At the first end of the generator 304, there is a rotary seal 508 extending between an end portion of the rotor shaft 422 and the support fitting 414.

In addition to being structurally mounted to the power take-off device 302, the generator 304 is structurally mounted to the support casing 212. In this particular example, it is mounted on the support casing 212 by a bracket 510 which engages the housing 426 and is mounted to an attachment point 512 on the support casing 212. However, in other examples, any suitable mounting arrangement may be provided between the generator and the support casing 212.

An example of use of the vehicle 10 to generate power using the power generation assembly 300 for a TRS will now be described, by way of example, with reference to the vehicle 10 and power generation assembly 300 described above with respect to FIGS. 1-6.

In use, the vehicle 10 is operated by activating the prime mover 20 so that the engine side input 404 of the torque converter 402 rotates within an operational range of rotational speed. For example, the operational range of rotational speed may be between 500 and 5,000 rpm.

Since the mechanical transfer arrangement 410 is coupled to the engine side input 404, rather than downstream of the torque converter (i.e. to the transmission side output 406 or the transmission 408), mechanical power is transferred to the power take-off device 302 whenever the engine is active. In this example, there is no clutch to engage the power take-off device 302, which simplifies the arrangement and reduces the number of points of mechanical failure.

The power take-off device 302 transfers the mechanical power to rotate the rotor 420 of the generator 304. In this example, there is a gear ratio of 1:1.25 between the engine rotational speed (i.e. the engine side input 404) and the rotor 420 of the generator 304.

The controller 430 selectively electrically decouples and couples the generator 304 to a load network, which in this example comprises a transport refrigeration system (TRS) and may further comprise the APU 40 for charging. The controller 430 therefore switches between a coupled state and a decoupled state of the generator.

With the controller in the coupled state, rotation of the rotor relative to the stator generates electrical current in the stator coils, which is conveyed via the stator cables to the load network. Current generation leads to a reacting force on the rotor. The voltage output of the generator 304 is a function of the rotational speed of the rotor.

In this example, the generator is configured to generate at least 8 kW of power for supply to the load when the engine rotational speed is 500 rpm, which corresponds to a rotational speed of the rotor 420 of 625 rpm, and is configured to generate at least 40 kW of power when the engine rotational speed is 2500 rpm, which corresponds to a rotational speed of the rotor 420 of 3125 rpm. The generator is configured to generate approximately 20 kW of power when the engine rotational speed is 1200 rpm, corresponding to a rotational speed of the rotor 420 of 1500 rpm. The controller 430 is configured to electrically decouple the generator from the load at a high voltage condition of the power generation assembly, to prevent the supply of power to the load at an excessive voltage. Such control may be initiated based on any suitable parameter. For example, the controller 430 may receive a signal from a sensor monitoring a rotational speed of a component in the drive train between the engine input and the generator, for example the engine side input 404, a component of the mechanical transfer arrangement 410, a component of the power take-off device 302, or the rotor 420 of the generator 304. Alternatively or additionally, the controller 430 may receive a signal from a sensor monitoring an electrical parameter, for example a voltage output of the generator, a current or a power in a load circuit coupled to the generator 304.

In this particular example, the controller 430 is configured to receive a signal comprising a rotation parameter corresponding to the rotational speed of the engine side input, determines whether the generator is in the high voltage condition based on the rotation parameter, and is configured to selectively electrically isolate (i.e. decouple) the generator when it determines that the generator is in the high voltage condition. In this example, the high voltage condition is determined when the rotation parameter indicates that the engine rotational speed is at least 2,500 rpm, corresponding to a rotational speed of the rotor 420 of the generator of 3,125 rpm. In other examples, any suitable threshold of rotational speed may be set for determining the high voltage condition. The controller may comprise a power semiconductor switch in order to selectively electrically decouple and couple the generator 304 to the load.

In this particular example, the generator 304 is configured to provide between 8-42 kW of power to the load when the engine rotational speed is within an operational range for the generator of between 500 rpm-2,500 rpm, which corresponds to a rotor rotational speed of 625 rpm-3125 rpm.

By using a controller to selectively electrically decouple the generator 304 from the load in the high voltage condition, the power generation assembly achieves a particularly simple mechanical arrangement while preventing the supply of power at excess voltage. Previously considered arrangements (albeit relying on prop-shafts to power the generator) rely on clutches to selectively mechanically disengage the generator from the power take-off device. However, the use of a clutch increases the complexity of the power generation arrangement and the number of points of failure.

While a particular example of the invention has been described herein with reference to a vehicle which is a semi-tractor, the term "vehicle" as used herein is intended to be interpreted broadly, including at least all tractors and trucks.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

For the avoidance of doubt, the disclosure extends to the subject-matter of the following numbered paragraphs, or "Paras":

Para 1. A power generation assembly for powering a transport refrigeration system (TRS) of a vehicle, the power generation assembly comprising:
  a torque converter having an engine side input and a transmission side output;
  a power take-off device coupled to the engine side input of the torque converter, the power take-off device having a rotary output;
  a permanent magnet generator having a rotor directly coupled to the power take-off device for power generation;
  wherein the power generation assembly is configured to be housed in an engine bay of a vehicle, and is configured to generate at least 8 kW of power when the engine side input has a rotational speed of 500 rpm.

Para 2. A power generation assembly according to Para 1, wherein the power take-off device is coupled to the engine side input of the torque converter by a clutch-less connection.

Para 3. A power generation assembly according to Para 1 or 2, wherein the power take-off device provides a gear ratio between the engine side input of the torque converter and the rotor of the permanent magnet generator of between 1:1.1 and 1:1.75, for example between 1:1.2 and 1:1.5.

Para 4. A power generation assembly according to any preceding Paras, wherein the torque converter is mounted within a support casing so that a rotation axis of the torque converter is fixed with respect to the casing, and
  wherein the power take-off device and the permanent magnet generator are fixedly mounted to the support casing.

Para 5. A power generation assembly according to Para 4, wherein the support casing is provided with damping supports for coupling to a frame of the engine bay of the vehicle so as to permit movement of the support casing relative to the frame, and
  wherein the power take-off device and the permanent magnet generator are mounted to the support casing so that in use they move relative to the frame together with the support casing.

Para 6. A power generation assembly according to any preceding Para, wherein a transmission is coupled to the transmission side output of the torque converter, the transmission being provided within the support casing;
  wherein the support casing has an elongate extent along a rotational axis of the transmission;
  wherein the permanent magnet generator is elongate along a generator axis about which the rotor rotates; and
  wherein, with respect to the rotational axis of the transmission, the axial extent of the permanent magnet generator overlaps with or is within the axial extent of the support casing.

Para 7. A power generation assembly according to Para 6, wherein the power take-off device and the permanent magnet generator are configured so that the generator axis is substantially parallel to the transmission axis and/or a rotary axis of the engine side input.

Para 8. A power generation assembly according to any preceding Para, wherein the generator comprises a bearing arrangement configured to support the rotor, separate from any bearing arrangement of the power take-off device.

Para 9. A power generation assembly according to any preceding Para, wherein the generator has a length L along the generator axis and a rotor outer diameter D, wherein the length to diameter ratio L/D is at least 2, optionally at least 2.5.

Para 10. A power generation assembly according to any preceding Para, wherein
the L/D ratio is at least 200% greater than $$\frac{\pi}{4\sqrt{p}},$$

wherein p is the number of pole pairs, for example at least 300% greater or 400% greater.

Para 11. A power generation assembly according to any preceding Para, comprising a liquid cooling arrangement for the generator.

Para 12. A power generation assembly according to any preceding Para, wherein the generator comprises an end shield at an axial end opposite the power take-off device,
wherein the generator comprises fluid ports for coupling a liquid cooling circuit to cooling channels within the generator, and wherein the fluid ports are provided in the end shield; and/or
wherein electrical terminals for stator windings of the generator are provided in the end shield.

Para 13. A power generation assembly according to any preceding Para, wherein the generator is provided in a generator housing having a diameter or characteristic lateral dimension at axial locations along the generator axis of no more than 200 mm, for example no more than 175 mm or no more than 150 mm.

Para 14. A power generation assembly according to any preceding Para, wherein the rotor has a laminated structure comprising a plurality of laminations, each lamination comprising slots which are aligned along the generator axis to define elongate channels in which respective permanent magnets are received.

Para 15. A power generation assembly according to any preceding Para, wherein the generator is configured to provide power to a load via a load circuit, the generator having an output voltage which is a function of the rotational speed of the rotor;
wherein the power generation assembly further comprises a controller configured to selectively electrically isolate the generator based on determining a high voltage condition of the power generation assembly.

Para 16. A power generation assembly according to Para 15, wherein the controller determines the high voltage condition of the power generation assembly based on a rotation parameter indicative of a rotational speed of the rotor; or an electrical parameter indicative of a voltage, current or power in the load circuit.

Para 17. A vehicle comprising a power generation assembly in accordance with any one of the preceding Paras, wherein the vehicle comprises an engine bay, and wherein the power generation assembly is disposed within the engine bay.

Para 18. A vehicle according to Para 17, wherein the power generation assembly is in accordance with Para 5, wherein the damping supports extend between a frame of the engine bay and the support casing;
wherein there are no supports extending between the frame of the engine bay and the power take-off device; and
wherein there are no supports extending between the frame of the engine bay and the generator.

Para 19. A vehicle according to Para 17 or 18, wherein a transport refrigeration system (TRS) is installed in the vehicle and the generator is coupled to the transport refrigeration system to provide power to the transport refrigeration system.

Para 20. A vehicle according to Para 19, wherein power is provided directly from the generator to the transport refrigeration system without any intervening hydraulic system.

The invention claimed is:

1. A power generation assembly for powering a transport refrigeration system (TRS) of a vehicle, the power generation assembly comprising:
    a torque converter having an engine side input and a transmission side output;
    a power take-off device coupled to the engine side input of the torque converter, the power take-off device having a rotary output;
    a permanent magnet generator having a rotor directly coupled to the power take-off device for power generation;
    wherein the power generation assembly is configured to be housed in an engine bay of a vehicle, and is configured to generate at least 8 kW of power when the engine side input has a rotational speed of 500 rpm.

2. A power generation assembly according to claim 1, wherein the power take-off device is coupled to the engine side input of the torque converter by a clutch-less connection.

3. A power generation assembly according to claim 1, wherein the power take-off device provides a gear ratio between the engine side input of the torque converter and the rotor of the permanent magnet generator of between 1:1.1 and 1:1.75.

4. A power generation assembly according to claim 1, wherein the torque converter is mounted within a support casing so that a rotation axis of the torque converter is fixed with respect to the casing, and
    wherein the power take-off device and the permanent magnet generator are fixedly mounted to the support casing.

5. A power generation assembly according to claim 4, wherein the support casing is provided with damping supports for coupling to a frame of the engine bay of the vehicle so as to permit movement of the support casing relative to the frame, and
    wherein the power take-off device and the permanent magnet generator are mounted to the support casing so that in use they move relative to the frame together with the support casing.

6. A power generation assembly according to claim 1, wherein a transmission is coupled to the transmission side output of the torque converter, the transmission being provided within the support casing;
    wherein the support casing has an elongate extent along a rotational axis of the transmission;
    wherein the permanent magnet generator is elongate along a generator axis about which the rotor rotates; and
    wherein, with respect to the rotational axis of the transmission, the axial extent of the permanent magnet generator overlaps with or is within the axial extent of the support casing.

7. A power generation assembly according to claim 6, wherein the power take-off device and the permanent magnet generator are configured so that the generator axis is substantially parallel to the transmission axis and/or a rotary axis of the engine side input.

8. A power generation assembly according to claim 1, wherein the generator comprises a bearing arrangement configured to support the rotor, separate from any bearing arrangement of the power take-off device.

9. A power generation assembly according to claim 1, wherein the generator has a length L along the generator axis and a rotor outer diameter D, wherein the length to diameter ratio L/D is at least 2.

10. A power generation assembly according to claim 1, wherein the L/D ratio is at least 200% greater than $$\frac{\pi}{4\sqrt{p}},$$

wherein p is the number of pole pairs.

11. A power generation assembly according to claim 1, comprising a liquid cooling arrangement for the generator.

12. A power generation assembly according to claim 1, wherein the generator comprises an end shield at an axial end opposite the power take-off device,
wherein the generator comprises fluid ports for coupling a liquid cooling circuit to cooling channels within the generator, and wherein the fluid ports are provided in the end shield; and/or
wherein electrical terminals for stator windings of the generator are provided in the end shield.

13. A power generation assembly according to claim 1, wherein the generator is provided in a generator housing having a diameter or characteristic lateral dimension at axial locations along the generator axis of no more than 200 mm.

14. A power generation assembly according to claim 1, wherein the rotor has a laminated structure comprising a plurality of laminations, each lamination comprising slots which are aligned along the generator axis to define elongate channels in which respective permanent magnets are received.

15. A power generation assembly according to claim 1, wherein the generator is configured to provide power to a load via a load circuit, the generator having an output voltage which is a function of the rotational speed of the rotor;
wherein the power generation assembly further comprises a controller configured to selectively electrically isolate the generator based on determining a high voltage condition of the power generation assembly.

16. A power generation assembly according to claim 15, wherein the controller determines the high voltage condition of the power generation assembly based on a rotation parameter indicative of a rotational speed of the rotor; or an electrical parameter indicative of a voltage, current or power in the load circuit.

17. A vehicle comprising a power generation assembly and an engine bay, wherein the power generation assembly includes:
a torque converter having an engine side input and a transmission side output;
a power take-off device coupled to the engine side input of the torque converter, the power take-off device having a rotary output;
a permanent magnet generator having a rotor directly coupled to the power take-off device for power generation;
wherein the power generation assembly is configured to be housed in an engine bay of a vehicle, and is configured to generate at least 8 kW of power when the engine side input has a rotational speed of 500 rpm, and
wherein the power generation assembly is disposed within the engine bay.

18. A vehicle according to claim 17, wherein the torque converter is mounted within a support casing so that a rotation axis of the torque converter is fixed with respect to the casing;
wherein the power take-off device and the permanent magnet generator are fixedly mounted to the support casing;
wherein the support casing is provided with damping supports for coupling to a frame of the engine bay of the vehicle so as to permit movement of the support casing relative to the frame;
wherein the power take-off device and the permanent magnet generator are mounted to the support casing so that in use they move relative to the frame together with the support casing;
wherein the damping supports extend between a frame of the engine bay and the support casing;
wherein there are no supports extending between the frame of the engine bay and the power take-off device; and
wherein there are no supports extending between the frame of the engine bay and the generator.

19. A vehicle according to claim 17, wherein a transport refrigeration system (TRS) is installed in the vehicle and the generator is coupled to the transport refrigeration system to provide power to the transport refrigeration system.

20. A vehicle according to claim 19, wherein power is provided directly from the generator to the transport refrigeration system without any intervening hydraulic system.

* * * * *